United States Patent
Kahl et al.

(10) Patent No.: US 9,134,107 B2
(45) Date of Patent: Sep. 15, 2015

(54) SOLENOID VALVE HAVING A CONDITION MONITORING UNIT, AND A METHOD OF CONDITION MONITORING A SOLENOID VALVE

(71) Applicant: BUERKERT WERKE GMBH, Ingelfingen (DE)

(72) Inventors: Sebastian Kahl, Forchtenberg (DE); Jochen Schenkel, Ailringen (DE)

(73) Assignee: Buerkert Werke GmbH, Ingelfingen (DE)

( * ) Notice: Subject to any disclaimer, the term of this patent is extended or adjusted under 35 U.S.C. 154(b) by 154 days.

(21) Appl. No.: 13/849,726

(22) Filed: Mar. 25, 2013

(65) Prior Publication Data

US 2013/0249537 A1  Sep. 26, 2013

(30) Foreign Application Priority Data

Mar. 26, 2012  (DE) .......................... 10 2012 005 936

(51) Int. Cl.
| | | |
|---|---|---|
| *G01B 7/14* | (2006.01) | |
| *G01B 7/00* | (2006.01) | |
| *G01B 7/004* | (2006.01) | |

(Continued)

(52) U.S. Cl.
CPC .............. *G01B 7/00* (2013.01); *F16K 37/0041* (2013.01); *G01B 7/004* (2013.01); *H01F 7/1844* (2013.01)

(58) Field of Classification Search
CPC ... H01F 7/1614; H01F 7/1615; H01F 7/1844; F16K 31/06; F16K 11/044; F16K 31/02; F16K 37/0041; G01B 7/00; G01B 7/04
USPC ........ 324/207.01–207.15; 361/160, 170, 210; 335/136, 234, 267, 268; 336/208, 336/212–222; 251/129.01–129.22
See application file for complete search history.

(56) References Cited

U.S. PATENT DOCUMENTS

| | | | |
|---|---|---|---|
| 4,870,364 A | 9/1989 | Trox et al. | |
| 4,907,901 A * | 3/1990 | Mitchell | .................... 400/157.2 |
| 6,762,922 B2 * | 7/2004 | Mednikov et al. | ............ 361/160 |

(Continued)

FOREIGN PATENT DOCUMENTS

| | | |
|---|---|---|
| DE | 202008005238 U1 | 7/2008 |
| DE | 102007052022 A1 | 5/2009 |

(Continued)

OTHER PUBLICATIONS

English translation of Chinese counterpart office action received Jan. 9, 2015.

*Primary Examiner* — Arleen M Vazquez
*Assistant Examiner* — Steven Yeninas
(74) *Attorney, Agent, or Firm* — Carlson, Gaskey & Olds, PC

(57) ABSTRACT

A solenoid valve having a condition monitoring unit, and a method of condition monitoring this solenoid valve are specified. A core of the solenoid valve can be shifted with respect to a holding coil and a measuring coil. A reading voltage is applied to the measuring coil, and the current intensity of a current flowing through the measuring coil is determined at a first and a second time. The first measuring is performed during a switching-on or switching-off operation of the current flowing through the measuring coil. The second measuring is performed when the current intensity of the current flowing through the measuring coil has reached a stationary condition.

15 Claims, 5 Drawing Sheets

(51) Int. Cl.
  *F16K 37/00* (2006.01)
  *H01F 7/18* (2006.01)

(56) References Cited

U.S. PATENT DOCUMENTS 6,895,997 B2  5/2005  Qu
2003/0098686 A1  5/2003  Mednikov et al.
2007/0053133 A1*  3/2007  Evans ........................ 361/160

FOREIGN PATENT DOCUMENTS

DE  102008044217 A1  6/2010
DE  102010062971 A1  6/2012
GB  2205198 A  11/1988

* cited by examiner

SOLENOID VALVE HAVING A CONDITION MONITORING UNIT, AND A METHOD OF CONDITION MONITORING A SOLENOID VALVE

CROSS-REFERENCE TO RELATED APPLICATION

This application claims priority to DE 10 2012 005 936.1, filed Mar. 26, 2012.

TECHNICAL FIELD

The invention relates to a method of condition monitoring a solenoid valve and to a solenoid valve having a condition monitoring unit.

BACKGROUND

Valves having a magnetic drive, referred to as solenoid valves below, use a core movable along an axial direction which can be shifted between a first and a second end position through electromagnetic interaction with the magnetic field of one or more coil(s). In a solenoid valve, the control of the flow is realized via the travel of the core moved with respect to the coil or coils, the flow being directly connected to the position of the core or to the core travel. When the core travel does not change or is even reduced although an appropriate voltage is applied, a malfunction of the solenoid valve is to be assumed which can be caused, e.g., by a blocked core. Within the context of condition monitoring, it is desired to detect such error conditions.

The position of the core of a solenoid valve could be detected using an additional sensor which would however have to be integrated in the solenoid valve. This sensor could provide an appropriate measured value for the condition monitoring. However, an additional sensor means extra charges and possibly higher constructional expenditure for the solenoid valve.

Alternative approaches use the properties of the coil or coils of a solenoid valve and detect, for example, a current drop directly after pick-up of the solenoid valve. Though a solution of this type can do without additional sensors, a disadvantage consists in that a core movement must always take place to obtain appropriate measured values for the condition monitoring. In the running operation of a solenoid valve, the core movements are however limited to planned switching operations. As a result, the condition monitoring in the running operation would be limited to individual points in time, more specifically to the switching operations. Therefore, a continuous condition monitoring independent of the switching operations cannot be realized.

SUMMARY

An improved method of condition monitoring a solenoid valve and an improved solenoid valve having a condition monitoring unit are provided.

According to one aspect of the invention, a method of condition monitoring a solenoid valve is specified. The solenoid valve has a core which can be moved along an axial direction with respect to a double coil. In a stationary condition of the solenoid valve in which no flow change and accordingly no movement of the core occurs, a first part of the double coil is used as a holding coil, and a second part of the double coil is used as a measuring coil. In this stationary stage, a reading voltage is applied to the measuring coil which causes a change in a magnitude of current intensity of current flowing through the measuring coil. Such a change can be both an increase and a decrease in the current intensity. The reading voltage preferably changes a clamping voltage applied to the measuring coil discontinuously, wherein both an increase and a discontinuous decrease in the voltage applied can again be caused. The magnitude and/or the sign of the reading voltage applied to the measuring coil is chosen such that a current flowing through the measuring coil as a result of the reading voltage, i.e. the current intensity thereof, is so low that a retaining force exerted by the holding coil on the core is not reduced below a predetermined value. Advantageously, the full serviceability of the solenoid valve is thus also maintained during the measuring operation performed at the measuring coil.

A first measured value for the magnitude of the current intensity of the current flowing through the measuring coil is then detected at a first time, i.e. after having applied the reading voltage to the measuring coil. This first measured value is detected during a switching-on or switching-off operation of the current flowing through the measuring coil caused by the reading voltage applied. In other words, the first time is within a time interval which is determined by the time extension of the switching-on or switching-off operation of the current in the measuring coil.

A second measured value for the magnitude of the current intensity of the current flowing through the measuring coil is detected at a second and later time. This second measuring of the current intensity takes place during a stationary condition of the current flowing through the measuring coil. Regarding the time interval mentioned above which is defined by the time extension of the switching-on or switching-off operation, the second time is thus outside the time interval concerned.

The first and second measured values are compared with reference values which have been previously calculated for example from theoretical models or simulations or which have been determined using calibration measurements. A position of the core with respect to the measuring coil is determined on the basis of this comparison.

Within the context of the present specification, the comparison of the measured values with corresponding reference values includes a comparison of mathematical connections of the measured values with appropriate mathematical connections of the reference values. According to a further embodiment, it is for example possible to form the quotient of the first and the second measured value which is then compared with a reference quotient formed of a first and a second reference value.

According to one embodiment, a warning signal can be output in case the position of the core determined in this way is outside a tolerance range. Such a tolerance range is preferably defined with respect to the end positions of the core which correspond for example to a fully open (maximum flow) or a fully closed valve (no flow). In other words, a malfunction of the solenoid valve is thus indicated if the valve can no longer be fully opened or closed, apart from accepted tolerances, and the flow does no longer take the provided maximum or minimum value.

If a voltage is applied to a coil which causes a discontinuous change of the clamping voltage, a current flowing through the coil does not directly change to a stationary state. The value for the current intensity of the current flowing through the coil approximates a stationary value in an exponential course. This exponential course of the current intensity is characterized by the time constant tau=L/R, with L being the inductance of the coil and R being the ohmic resistance thereof. The inductance of the coil of a solenoid valve depends, among other things, on the position of the core so that the other way around, the position of the core can be concluded from the value for tau. In other words, the time constant tau of the coil therefore depends on the core position.

In case the external conditions remain constant, expect for the position of the core, it is possible to deduce the value of tau from one single value for the current intensity at a determined time, as the variation with time of the current intensity is fully described by the exponential function. In this idealized case, it could thus be possible to deduce the position of the core with respect to the measuring coil on the basis of one single pair of measured values composed of the time of the measured value record, measured from the moment of application of the reading voltage to the measuring coil, and the measured current intensity of the momentary current through the measuring coil.

However, due to external factors of influence, in particular due the temperature changes or variations at the coil, the resistance of the coil changes, which is also taken into account in the time constant. In case the position of the core is deduced from one single pair of measured values under these conditions, such as described above, measuring errors can occur when determining the time constant tau, as a result of which an incorrect position of the core would be deduced.

For this reason, two measured values for the magnitude of the current intensity of the current flowing through the coil are determined in the method according to aspects of the invention. A first measured value is taken during the switching-on or switching-off operation, a second measured value is taken during the stationary condition. The current flowing through the measuring coil in the stationary condition depends, among other things, on the ohmic resistance of the measuring coil which in turn depends on the temperature, such that in particular temperature-dependent effects can be taken into account or compensated for using the provided method of condition monitoring the solenoid valve. This is particularly advantageous as a heating of the valve due to the design cannot be excluded even during normal operation of a solenoid valve.

The switching-on or switching-off operation of the current flowing through the measuring coil starts at the moment when the reading voltage is applied to the measuring coil, and ends when the current intensity of the current flowing through the measuring coil has reached a stationary condition. The switching-on or switching-off operation is thus described by a time interval which starts with the application of the reading voltage. The end of this time interval is considered reached at the moment when the actual current intensity still differs only slightly from an assumed current intensity in the stationary condition. According to one embodiment, the end of the switching-on or switching-off operation is reached when the current intensity has reached 99.3% of its final value. In an exponential course of the current intensity, this value is obtained after a time of t=5*tau_max.

As the value for the time constant tau changes, depending on the initially unknown position of the core, the time interval mentioned is defined as a precaution on the basis of the quintuple of a maximum value tau_max of the time constant. The time constant takes its maximal value when the core is in maximum interaction with the measuring coil and is, for example, completely plunged therein.

In other words, according to one embodiment of the invention, a first measured value for the current intensity is taken within the 5*tau_max range, and a second measured value is taken outside the 5*tau_max range. On the basis of these two measured values, it is possible to reliably and unambiguously deduce the position of the core and therefore to detect a possible malfunction of the valve also in case of a varying resistance of the measuring coil, i.e. also in case of a varying temperature of the solenoid valve. The described method is of course not limited to a range defined by 5*tau_max. It is also possible to make a definition on the basis of a multiple of tau_max, for example 3*tau_max or also 6*tau_max.

To furthermore exclude the further factor of influence of a varying supply voltage which also has an influence on the current flowing through the measuring coil, it is possible according to a further embodiment to also determine a value for the reading voltage applied to the measuring coil in addition to the values for the current intensity of the current flowing through the measuring coil. An unambiguous determination of the core position is possible using the three measured values determined in this way, wherein external influences such as temperature variations or changes in the supply voltage, for example, can be compensated for. Though a compensation of variations of the supply voltage is not necessary on condition that the supply voltage corresponds exactly to the magnetic coil voltage, the provided voltage compensation increases the reliability of the method of condition monitoring the solenoid valve.

An association between the determined measured values and the position of the core can be performed using reference curves or values determined in advance, or using theoretical calculations or models. Such a comparison is preferably carried out by a control device, for example using a programmable microcontroller. For core positions which are outside predetermined tolerance ranges, a malfunction of the solenoid valve must be assumed. As a reaction, it is, for example, possible to output a warning signal.

The detection of the first and second measured values for the magnitude of the current intensity and, if necessary, also the detection of the third measured value of the magnitude of the reading voltage preferably occur at fixedly predetermined first to third points in time. In such a method, merely three measurements are advantageously necessary, which furthermore take place at fixedly predetermined times. This considerably reduces the metrological expenditure, in particular as no continuous detection of the current intensity is to be performed, which would require an accordingly high sampling rate.

According to a further embodiment, the detection of the reading voltage applied to the measuring coil takes place at a third point in time between the first and the second points in time, at which one respective magnitude of the current intensity is detected. The measuring of the magnitude of the reading voltage, from the moment of application of the latter to the measuring coil, can in principle take place at any moment. However, a third point in time lying in the window of time between the first and second points in time is advantageous as this window of time would otherwise elapse unused.

The reading voltage applied to the measuring coil is preferably a voltage varying in a stepped manner, for example a square-wave voltage. A period of the square-wave voltage is furthermore preferably chosen such that a semi-oscillation of the square-wave voltage is longer than the duration of the switching-on or switching-off operation of the current in the measuring coil caused by the voltage change. In other words, a semi-oscillation of the square-wave voltage is thus greater than 5*tau_max. According to further embodiments, instead of a time interval of 5*tau_max, the switching-on or switching-off operation of the current in the measuring coil can also be considered completed after a multiple of tau_max, for example already after 2*tau_max, 3*tau_max, or also after 6*tau_max or 7*tau_max. In this context, the maximum occurring value of tau, more specifically tau_max is also taken into consideration.

According to a further aspect of the invention, a solenoid valve is specified which has a core which can be shifted along an axial direction with respect to a double coil. The solenoid valve further comprises a condition monitoring unit which is set up to use or employ a first part of the double coil as a holding coil and a second part of the double coil as a measuring coil in a stationary condition of the solenoid valve. The condition monitoring unit is furthermore set up to apply a reading voltage to the measuring coil, which causes a change in the current intensity of the current flowing through the measuring coil. The condition monitoring unit is preferably designed to apply the already mentioned square-wave voltage as a reading voltage to the measuring coil.

The condition monitoring unit is preferably designed to choose the magnitude of such a reading voltage such that due to this voltage, merely a current flows in the measuring coil which is so low that a retaining force exerted by the holding coil on the core is not reduced below a predetermined value.

The condition monitoring unit is furthermore designed to detect a magnitude of the current intensity of a current flowing through the measuring coil at a first time. To this end, a shunt resistor which is series-connected with the measuring coil can be provided. The current intensity of the current flowing through the coil is, in this case, preferably sampled by an amplifier on the basis of the voltage drop occurring at the shunt resistor. The detection of this first measured value is performed during the switching-on or switching-off operation of the current flowing through the measuring coil. The condition monitoring unit is preferably thus designed to perform a first measuring of the current intensity within the time interval already mentioned, which is defined by a multiple of tau_max, for example by 5*tau_max.

A second measured value for the magnitude of the current intensity of the current flowing through the measuring coil is detected by the condition monitoring unit at a second time. During this second and later time, the current flowing through the measuring coil is in a stationary condition.

A third measured value can optionally be detected by the condition monitoring unit. This third measuring unit specifies a magnitude of the reading voltage applied to the measuring coil.

The first up to the third measured values detected in this way are each compared with predetermined reference values for these magnitudes to obtain a position of the core with respect to the measuring coil. The condition monitoring unit preferably comprises to this end a programmable microcontroller in which reference curves or values determined on the basis of reference measurements are stored, for example. A position of the core with respect to the measuring coil can be deduced from a comparison with these reference values. A further possibility to obtain the reference values is a model-based calculation which can also be performed by a microcontroller. As already mentioned in another place, a comparison between measured values and reference values also includes the comparison between a mathematical connection of the measured values and an equal mathematical connection of the reference values. It is thus possible, for example, to first form a quotient of the first and the second measured values for the magnitude of the current intensity which is then compared with a reference quotient formed of the reference current intensities. A comparison of the reading voltage detected as a third measured value with a corresponding reference value can then be performed.

According to a further embodiment, the condition monitoring unit is moreover designed to output a warning signal in case the determined position of the core is outside a tolerance range furthermore preferably determined with respect to an end position of the core. To this end, a microcontroller comprised in the condition monitoring unit can, for example, have or pilot a binary output, a corresponding warning signal being issued at this output. According to a further aspect, a light-emitting diode (LED) can be coupled to a corresponding output of the microcontroller. This LED may preferably be integrated into the housing of the solenoid valve. The LED may be activated in case a malfunction is determined.

In normal operation, the double coil of the solenoid valve is used to shift the core between the end positions along the axial direction. To perform the condition monitoring, one of the two parts of the double coil is converted into a measuring coil, the other part of the double coil still acting as a holding coil. It is thus possible to realize a condition monitoring in a solenoid valve having a double coil without a switching operation being necessary and without modifications having to made with regard to the design of the solenoid valve.

The condition monitoring unit can furthermore be set up to detect the current intensity of the first and of the second current flowing through the coil and, if necessary, also the reading voltage applied to the measuring coil at a fixedly predetermined first to third points in time. Advantageously, a microcontroller comprised in the condition monitoring unit need not be able to take measured values at a high data rate or sampling rate. As a result, an accordingly simple and inexpensive microcontroller can be used.

To generate the discontinuous voltage change at the measuring coil, the condition monitoring unit can moreover be designed to apply a square-wave voltage to the measuring coil. To this end, an appropriate voltage generator may be integrated into the condition monitoring unit.

Advantages already mentioned with respect to the method according to the invention apply in the same or in a similar manner to the solenoid valve according to aspects of the invention and are therefore not repeated.

These and other features may be best understood from the following drawings and specification.

BRIEF DESCRIPTION OF THE DRAWINGS

Further advantageous aspects of the invention will become apparent from the description below of preferred example embodiments with reference to the drawings which show.

DETAILED DESCRIPTION

Figure 1:
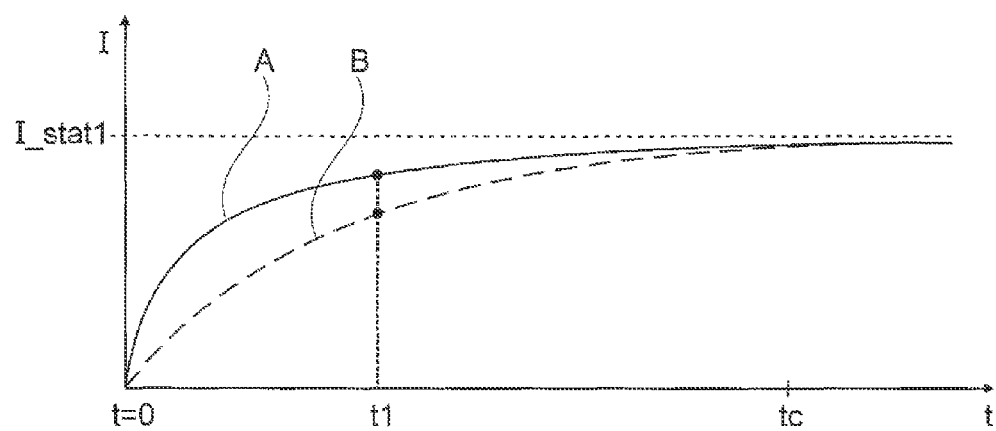
FIG. 1 shows different time-dependent courses of the current intensity of a current flowing through the coil of a solenoid valve during a switching-on operation.

FIG. 1 shows a schematic and simplified illustration of the time-dependent current intensity I of a current flowing through a measuring coil of a solenoid valve. At a time t=0, the clamping voltage applied to the coil changes abruptly, for example from U=0 to U=U1>0. A square-wave voltage alternating between U=0 and U=U1 can for example be applied to the coil. A first curve A shows the course of the current intensity I as a function of the time t for a coil in which the core is located in a first position. A second time-dependent curve B shows the course of the current intensity I in this coil, the core being located in a second position which differs from the first position.

The current intensity I(t) in the coil upon application of the voltage U1 follows in principle the known equation:

$$I(t) = \frac{U1}{R}\left(1 - e^{-\frac{t}{tau}}\right)$$

R being the ohmic resistance of the coil and with $$tau = \frac{L}{R}.$$

L is the inductance of the coil which depends on the position of the core. This results in different courses of the two curves A and B.

The qualitative course of the two curves A and B is described by the mentioned formula for I(t). The current intensity I(t) approaches asymptotically a stationary condition in which the magnitude of the current intensity in the measuring coil is I_stat1.

In FIG. 1, the stationary condition occurs from the time tc. At this time tc, the current intensity I(t) has reached more than 99.3% of its final value I_stat1 so that the switching-on operation can be considered completed. This value of the current intensity I(t) is reached after a time t which corresponds to the quintuple of the maximum time constant tau_max of the coil (tc=5*tau_max). This can be understood using the mentioned formula for I(t). It is of course possible to find alternative definitions of the stationary condition. It would for example be possible to assume the stationary condition already after the expiration of a time of 3*tau_max or also only after expiration of 7*tau_max.

As the value for tau depends on the position of the core and is thus initially unknown, the maximum occurring value for tau which is referred to as tau_max is used to define the stationary condition. In case the measuring coil is a moving coil, e.g., in the interior of which the core moves, the maximum value for tau occurs when the core is completely plunged into the coil. The maximum value tau_max can for example be determined on the basis of a measuring or by a theoretical calculation.

Assuming that the external boundary conditions are constant, apart from the position of the core, it is possible to determine the current value for tau and thus the position of the core using an individual measured value for the current intensity I(t1) applied at the time t1.

However, in case the solenoid valve is subject to external influences which change the temperature of the measuring coil, for example, this situation appears to be variable.

Figure 2:
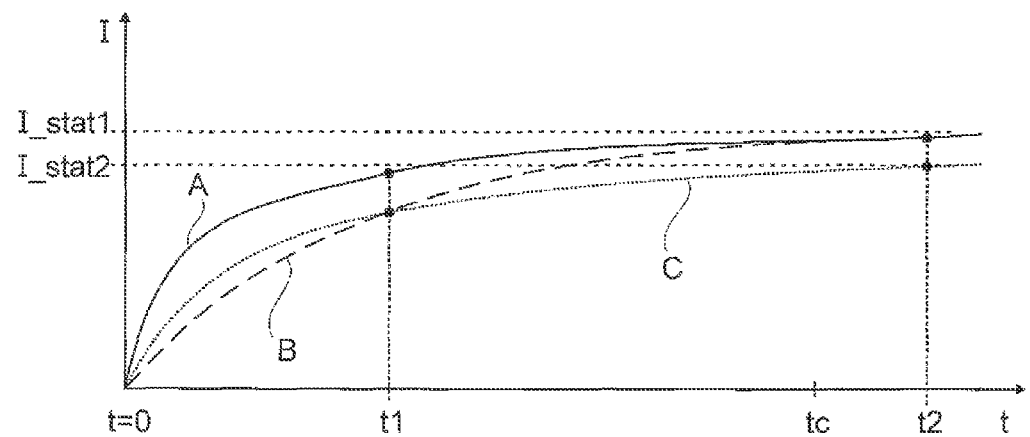
FIG. 2 shows different time-dependent courses of the current intensity of a current flowing through the coil of a solenoid valve during a switching-on operation.

FIG. 2 shows such a case. Curves A and B are already known from FIG. 1. The third curve C shows the time-dependent course of the current intensity of the current flowing through the measuring coil, the core being in the same position as in curve A. In comparison with curves A and B, the temperature of the measuring coil is however increased in the measuring C. For this reason, curve C approaches the comparatively lower maximum value I_stat2 for the current intensity asymptotically. If in such a case merely one single measuring is performed at the time t=t1, the curves B and C cannot be distinguished from each other as they have the same value at the time t1. The position of the core with respect to the measuring coil could not be determined in an unambiguous way.

According to an example embodiment, to permit a determination of the position of the core, in other words, to be thus able to make an unambiguous distinction between curves A and C, a second measuring of the current intensity I(t2) of the current flowing through the measuring coil is performed at the time t2. In contrast to the time t1 of the first measuring, the second time t2 is not within the interval defined by tc=5tau_max. The second measured value is taken at a second time t2 at which the switching-on operation can be considered completed. At the time t2, curves B and C clearly differ from each other. Whereas curve B asymptotically approaches value I_stat1, curve C asymptotically approaches value I_stat2. By measuring two current intensities I(t1), I(t2), it is possible to determine the position of the core with respect to the measuring coil unambiguously also in case of a variable temperature. This can for example be carried out by comparison of the measured values with previously measured or calculated reference curves or values.

Figure 3:
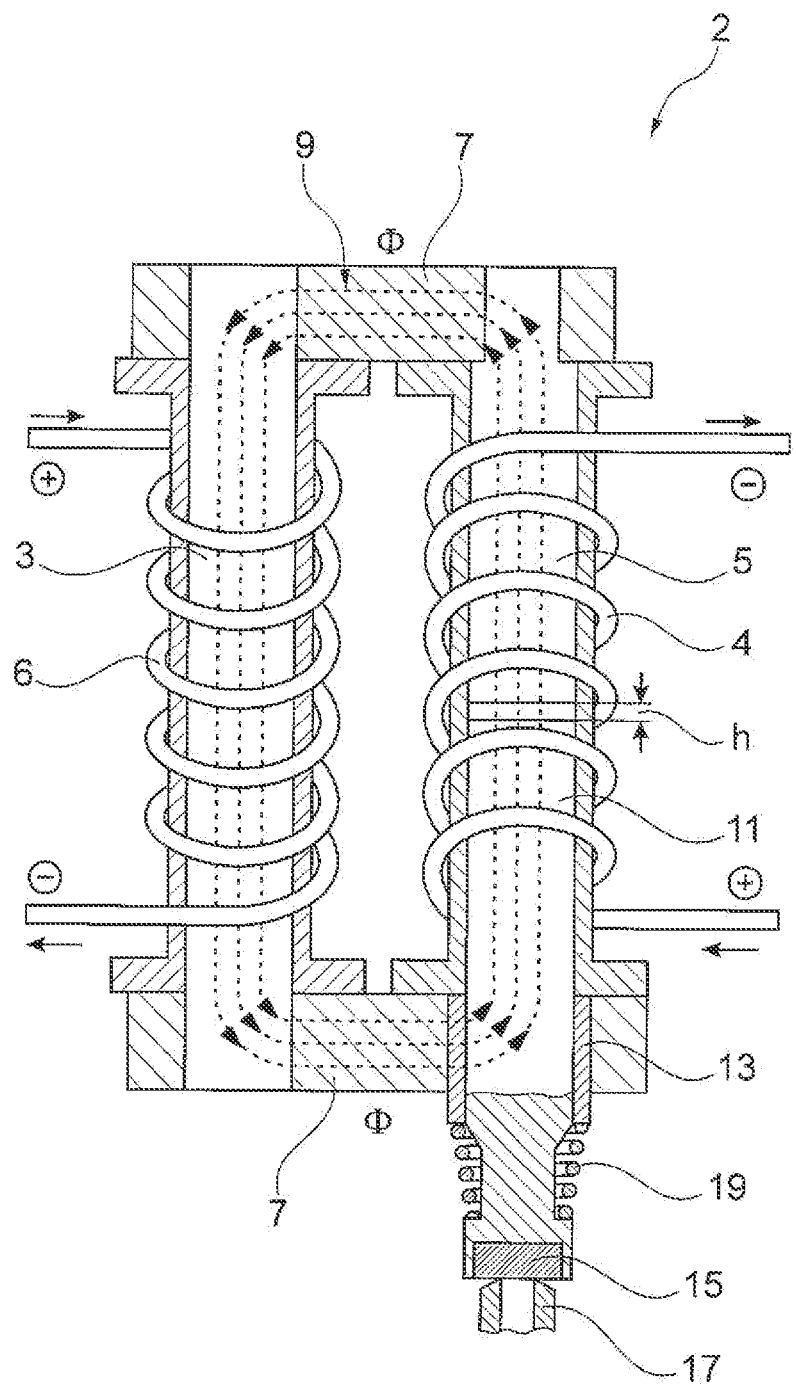
FIG. 3 shows a solenoid valve according to an example embodiment in a simplified sectional view.

FIG. 3 shows a solenoid valve 2 in a simplified sectional view. The solenoid valve 2 has a lifting armature drive which is composed of a magnetic yoke and two magnetic coils. A holding coil 4 and a measuring coil 6 are part of a double coil. They surround a yoke bolt 3 or yoke plug 5 and a core bolt 11 which are connected to each other by yoke limbs 7. The magnetic yoke formed of the yoke bolt 3, the yoke plug 5, the core bolt 11 and the yoke limbs 7 results in a magnetic flow Φ indicated by arrows 9. The magnetic yoke is merely interrupted by a gap having the height h between the yoke plug 5 and the core bolt 11. The core bolt 11 is guided so as to be axially movable and projects through an opening of the yoke limb 7 into which a pole sleeve 13 is inserted. The free end of the core bolt 11 supports a sealing body 15 cooperating with a sealing seat 17. A compression spring 19 resting on the one hand on the core bolt 11 and, on the other hand, on a shoulder urges the core bolt 11 or the seal body 15 towards the sealing seat 17.

Due to the interaction of the magnetic fields of the coils 4, 6 with the magnetic yoke, the core bolt 11 can be moved according to a travel between a first and a second position, preferably between a first and a second end position, and the switching operation of the valve 2 can be triggered.

Figure 4:
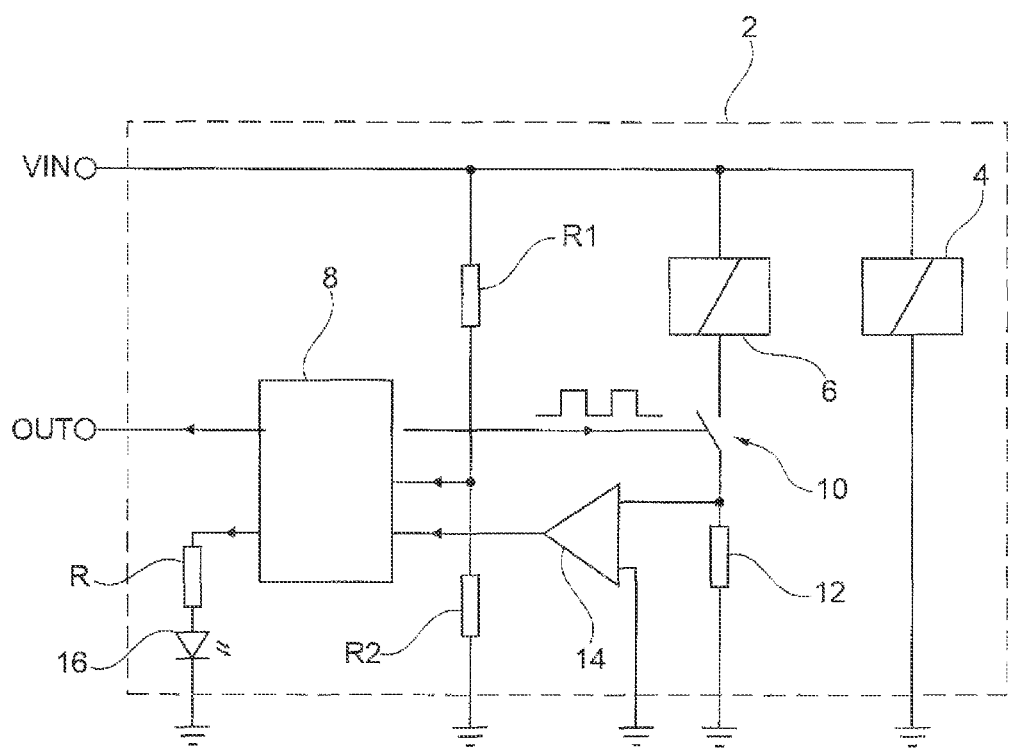
FIG. 4 shows a simplified circuit diagram of a solenoid valve having a condition monitoring unit according to an example embodiment.

FIG. 4 shows a simplified circuit diagram of the solenoid valve 2. The holding coil 4 and the measuring coil 6 are shown. Due to the interaction of the magnetic fields of these coils 4 and 6 with a magnetic yoke not shown in FIG. 4, it is possible to trigger the switching operation of the valve 2.

For condition monitoring the solenoid valve 2, a condition monitoring unit 8 is used which is preferably a microcontroller. To determine the position of the core with respect to the measuring coil 6, a reading voltage is applied to the measuring coil 6 by which the clamping voltage applied to the measuring coil 6 is changed abruptly. This preferably occurs by applying a square-wave signal to a switch 10. This control of the switch 10 results in the application of a reading voltage in the measuring coil 6 which is in turn a square-wave voltage. To this end, the measuring coil 6 is connected, on one side, to the supply voltage VIN and, on the opposite side, to the switch 10. The switch 10 is in turn coupled to mass via a shunt resistor 12. At a first point in time t1 which in terms of time is before tc=5tau_max, a first current intensity I(d) of the current flowing through the measuring coil 6 is determined as a first measured value. This current measuring is preferably performed by measuring the voltage drop across the shunt resistor 12, wherein an appropriate amplifier 14 can be used.

To this end, a first input of the amplifier 14 is coupled to the shunt resistor 12, and a second input is coupled to mass. The amplifier 14 provides a signal at its output which can be evaluated by the condition monitoring unit 8. At a second time t2, with t2>tc, a second current intensity I(t2) of the current flowing through the measuring coil 6 is determined as a second measured value. The condition monitoring unit 8 can in addition be set up to detect the input voltage VIN defining the magnitude of the reading voltage applied to the measuring coil 6 as a third measured value. This is preferably performed by a voltage divider composed of the resistors R1 and R2.

In the condition monitoring unit 8, the determined three measured values are compared with appropriate reference values for these magnitudes, so that a position of the core with respect to the measuring coil 6 can be deduced. It is of course also possible to compare a mathematical connection of the measured values with an appropriate mathematical connection of the reference values. It is, for example, possible to compare a quotient of the first and the second measured value for the current flowing through the measuring coil 6 with a quotient of the appropriate reference values. In case the position of the core is outside predetermined tolerance values, a warning signal can be issued at the output OUT. This signal may be a binary signal. Alternatively or additionally, a light-emitting diode (LED) 16 which serves as a warning and which is coupled between mass and an output of the condition monitoring unit 8 via a resistor may be activated. This LED 16 may preferably be integrated into a housing of the solenoid valve 2 so that a malfunction is directly readable for a user. The LED 16 can, for example, indicate the correct operation of the solenoid valve 2 by a continuous light emission, whereas it is possible to indicate a malfunction by a blinking of the LED.

Figure 5:
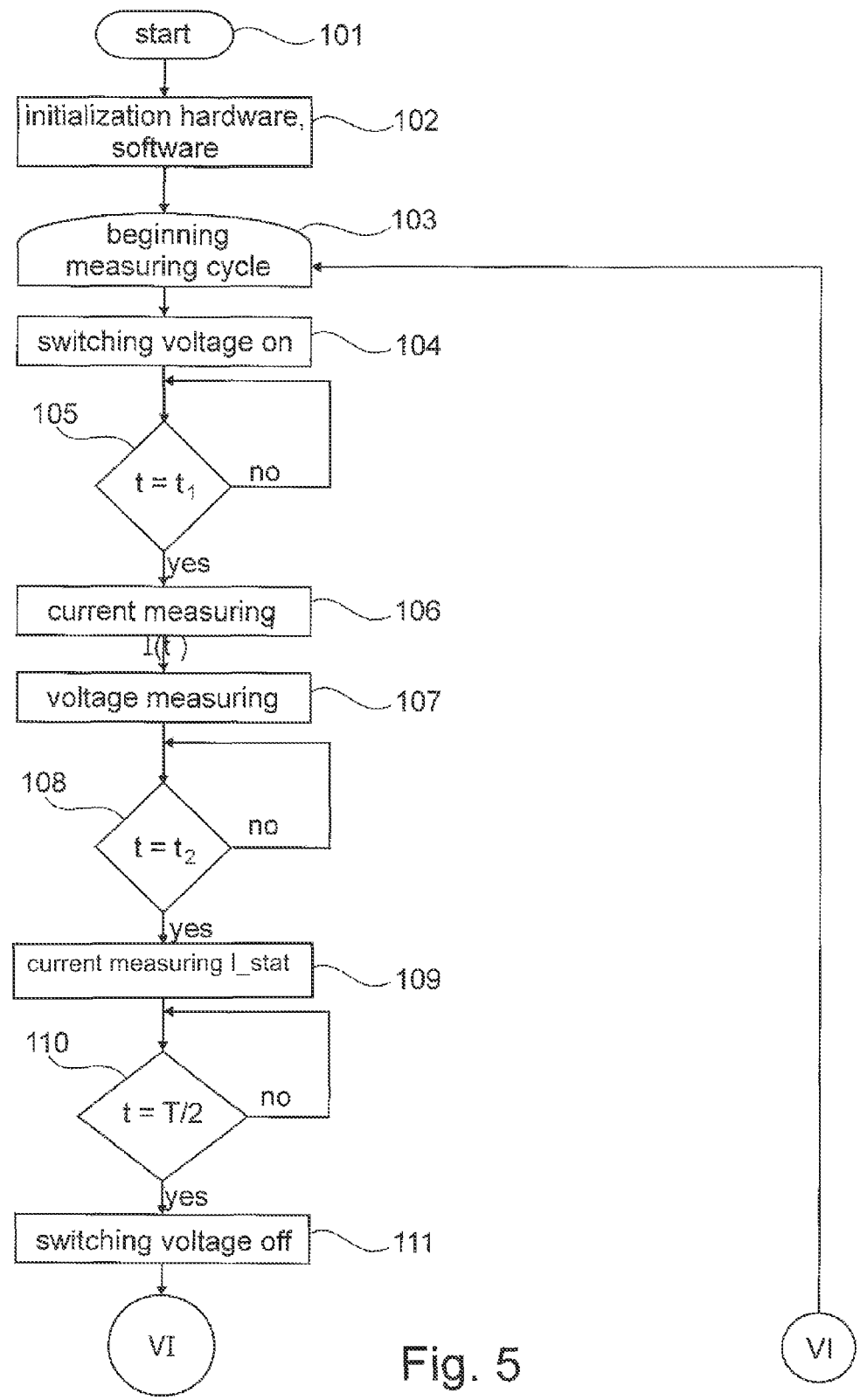
FIG. 5 shows a flow diagram showing a method of condition monitoring a solenoid valve according to an example embodiment.

A method of condition monitoring a solenoid valve 2 is explained below by way of example with reference to the flow diagram shown in FIGS. 5 and 6.

After the start 101 of condition monitoring, the appropriate components of the solenoid valve 2, in particular of the software running on the condition monitoring unit 8, are at first initialized 102. At the beginning 103 of a first measuring cycle, the reading voltage is applied 104 to the measuring coil 6 by an edge of the square-wave voltage closing the switch 10, for example. Simultaneously, with the beginning of the measuring cycle 103, a timer is started so that in step 105 it can be interrogated whether the time t1 is already reached for performing a first measuring of the current intensity I(t1). The predetermined time t1 can, for example, be determined by previous analyses and measurements and can then be stored as a fixed value in the software of the condition monitoring unit 8. When the time t=t1 is reached, a first magnitude of the current intensity is detected in step 106. The measuring of the magnitude of the reading voltage is then performed in step 107. As soon as the time t2 has been reached (with t2>tc=5tau_max), the comparison carried out in step 108 is positive, and a second measuring of the current intensity I(t2) follows in step 109. In this step 109, the current intensity of the current flowing through the measuring coil 6 in the stationary state is measured.

The condition monitoring of the solenoid valve 2 is performed at regular intervals T, the value T being chosen such that T/2 is greater than 5*tau_max. It is in this way ensured that the time t2 of the second measuring (step 109) is above 5*tau_max and the current intensity of the current flowing in a quasi-stationary state is detected. The value for T is, for example, defined by the frequency of the square-wave voltage output by the condition monitoring unit 8. In step 110, a comparison of the current time t with T/2 is performed. A switching-off of the reading voltage applied to the measuring coil 6, for example, by opening the switch 10, is carried out as soon as the time T/2 has elapsed (step 111).

Figure 6:
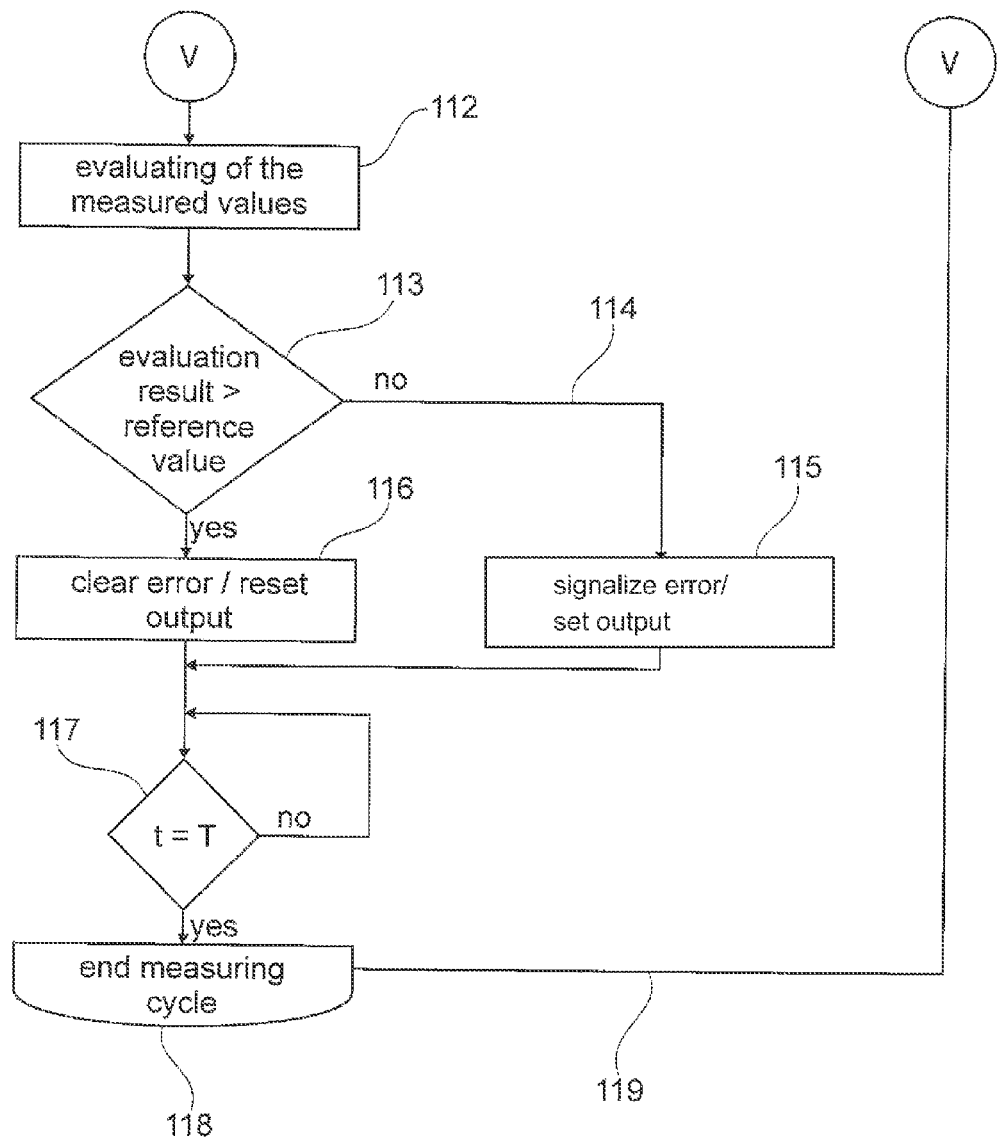
FIG. 6 shows a flow diagram showing a method of condition monitoring a solenoid valve according to an example embodiment.

In a subsequent step 112 shown in FIG. 6, an evaluation of the measured values, i.e. an evaluation of the current intensities I(t1) and I(t2) measured at the times t1 and t2, and an evaluation of the reading voltage applied to the measuring coil 6 are performed. In a comparing step 113, the measured values are compared with appropriate reference values stored in the condition monitoring unit 8. In case this comparison is negative, in other words in case it is detected that the core is outside a predetermined tolerance range, the method follows branch 114, and an error signal is provided in step 115 at the output OUT. Alternatively, the light-emitting diode 16 can be activated in step 115. In case the comparison is positive in the comparing step 113, i.e. in case the core is within the predetermined tolerance ranges, the errors possibly indicated previously are reset in the following step 116. The measuring cycle ends as soon as the duration t has reached the predetermined interval T of the measuring cycle, which is detected in the comparing step 117. After determination of the end of the measuring cycle in step 118, this cycle is again initialized in step 103, as illustrated by branch 119.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A method of condition monitoring a solenoid valve having a core bolt which can be shifted along an axial direction with respect to a double coil, wherein in a stationary switching condition of the solenoid valve, a first part of the double coil is used as a holding coil and a second part of the double coil is used as a measuring coil, and wherein the method comprises the following steps:
   a. surrounding a yoke bolt with measuring coil, surrounding a yoke plug and a core bolt with the holding coil, and providing yoke limbs to connect the core bolt and yoke plug to the yoke bolt, and wherein the core bolt is movable relative to the associated yoke limb,
   b. applying a reading voltage to the measuring coil, the reading voltage causing a change in current intensity of current flowing through the measuring coil,
   c. detecting a first measured value for a magnitude of the current intensity of the current flowing through the measuring coil at a first time during a switching-on or switching-off operation of the current flowing through the measuring coil caused by the reading voltage applied to the measuring coil,
   d. detecting a second measured value for the magnitude of the current intensity of the current flowing through the measuring coil at a second and later time during a stationary condition of the current flowing through the measuring coil, and
   e. comparing the first and the second measured values with predetermined reference values to determine a position of the core bolt with respect to the measuring coil.

2. The method according to claim 1, wherein the magnitude of the reading voltage applied to the measuring coil is detected as a third measured value, and wherein during the comparing step performed to determine the position of the core bolt, this third measured value is additionally compared with a predetermined reference value to determine the position of the core bolt with respect to the measuring coil.

3. The method according to claim 1, wherein a magnitude and/or a sign of the reading voltage is/are chosen such that a current generated by the reading voltage in the measuring coil does not reduce a retaining force exerted by the holding coil on the core below a predetermined value.

4. The method according to claim 1, wherein a warning signal is output in case the determined position of the core is outside a predetermined tolerance range, in particular a tolerance range defined with respect to an end position of the core.

5. The method according to claim 1, wherein a transition between the switching-on or the switching-off operation and the stationary condition of the current flowing through the measuring coil is determined by a multiple of a maximum time constant of the measuring coil.

6. The method according to claim 1, wherein the detection of the first and the second measured value and, if necessary, also the detection of the third measured value are performed at a fixedly predetermined first and second and, if necessary, third time.

7. The method according to claim 1, wherein the reading voltage is a square-wave voltage with a period of which is chosen such that a semi-oscillation of the square-wave voltage, considered in time, is longer than the switching-on or switching-off operation of the current flowing through the measuring coil.

8. The method according to claim 1, including providing a magnetic yoke formed of the yoke bolt, the yoke plug, the core bolt and the yoke limbs that results in a magnetic flow, and wherein magnetic yoke is only interrupted by a gap between the yoke plug and the core bolt.

9. The method according to claim 8, wherein one end of the core bolt faces the gap and an opposite end of the core bolt comprises a seal body that is engageable with a sealing seat as the core bolt moves between first and second end positions.

10. A solenoid valve having a core bolt which can be shifted along an axial direction with respect to a double coil, and a condition monitoring unit set up
    a. to use a first part of the double coil as a holding coil and a second part of the double coil as a measuring coil in a stationary switching condition of the solenoid valve, wherein a yoke bolt is surrounded by the measuring coil, a yoke plug and a core bolt are surround by the holding coil, and yoke limbs connect the core bolt and yoke plug to the yoke bolt, and wherein the core bolt is movable relative to the associated yoke limb,
    b. to apply a reading voltage to the measuring coil, the reading voltage causing a change in a magnitude of current flowing through the measuring coil,
    c. to detect a first measured value for the magnitude of current intensity of the current flowing through the measuring coil at a first time during the switching-on or switching-off operation of the current flowing through the measuring coil,
    d. to detect a second measured value for the magnitude of the current intensity of the current flowing through the measuring coil at a second and later time during a stationary condition of the current flowing through the measuring coil, and
    e. to compare the first and second measured values with predetermined reference values to determine a position of the core bolt with respect to the measuring coil.

11. The solenoid valve according to claim 10, wherein the condition monitoring unit is set up to detect a magnitude of the reading voltage applied to the measuring coil as a third measured value, and in addition to compare the third measured value with a predetermined reference value to determine a position of the core bolt with respect to the measuring coil.

12. The solenoid valve according to claim 10, wherein the condition monitoring unit is set up to detect the first and second measured values and, if necessary, the third measured value at a fixedly predetermined first and second and, if necessary, third time.

13. The solenoid valve according to claim 10, wherein the condition monitoring unit is set up to apply a square-wave voltage as a reading voltage to the measuring coil, a period of which is chosen such that a semi-oscillation of the square-wave voltage, considered in time, is longer than a switching-on or switching-off operation of the current flowing through the measuring coil.

14. The solenoid valve according to claim 10, including providing a magnetic yoke formed of the yoke bolt, the yoke plug, the core bolt and the yoke limbs that results in a magnetic flow, and wherein magnetic yoke is only interrupted by a gap between the yoke plug and the core bolt.

15. The solenoid valve according to claim 14, wherein one end of the core bolt faces the gap and an opposite end of the core bolt comprises a seal body that is engageable with a sealing seat as the core bolt moves between first and second end positions.

* * * * *

UNITED STATES PATENT AND TRADEMARK OFFICE
CERTIFICATE OF CORRECTION

| | | |
|---|---|---|
| PATENT NO. | : 9,134,107 B2 | Page 1 of 1 |
| APPLICATION NO. | : 13/849726 | |
| DATED | : September 15, 2015 | |
| INVENTOR(S) | : Sebastian Kahl et al. | |

It is certified that error appears in the above-identified patent and that said Letters Patent is hereby corrected as shown below:

IN THE CLAIMS:

In claim 1, column 10, line 43; after "with" insert --the--

Signed and Sealed this
Twenty-sixth Day of January, 2016

Michelle K. Lee
*Director of the United States Patent and Trademark Office*